(12) United States Patent
Couturier

(10) Patent No.: US 10,487,218 B2
(45) Date of Patent: Nov. 26, 2019

(54) FIRE RETARDANT COATING COMPOSITION

(71) Applicant: GCP Applied Technologies Inc., Cambridge, MA (US)

(72) Inventor: Marysusan Couturier, Framingham, MA (US)

(73) Assignee: GCP Applied Technologies Inc., Cambridge, MA (US)

( * ) Notice: Subject to any disclaimer, the term of this patent is extended or adjusted under 35 U.S.C. 154(b) by 0 days.

(21) Appl. No.: 15/302,737

(22) PCT Filed: Apr. 7, 2015

(86) PCT No.: PCT/US2015/024706
§ 371 (c)(1),
(2) Date: Oct. 7, 2016

(87) PCT Pub. No.: WO2015/157278
PCT Pub. Date: Oct. 15, 2015

(65) Prior Publication Data
US 2017/0029632 A1 Feb. 2, 2017

Related U.S. Application Data

(60) Provisional application No. 61/977,696, filed on Apr. 10, 2014.

(51) Int. Cl.
*C09D 5/18* (2006.01)
*C09D 109/08* (2006.01)
(Continued)

(52) U.S. Cl.
CPC .............. *C09D 5/18* (2013.01); *C09D 5/185* (2013.01); *C09D 109/08* (2013.01); *C09K 21/02* (2013.01); *E04B 1/944* (2013.01)

(58) Field of Classification Search
CPC ................................. C09D 5/18; C09D 5/185; E04B 1/665; E04B 1/944
See application file for complete search history.

(56) References Cited

U.S. PATENT DOCUMENTS

| 3,574,644 A | 4/1971 | Olstowski et al. |
| 3,955,031 A | 5/1976 | Jones et al. |
| (Continued) | | |

FOREIGN PATENT DOCUMENTS

| CA | 1132897 | 10/1982 |
| CN | 101851457 | 10/2010 |
| (Continued) | | |

OTHER PUBLICATIONS

Hornsby, "The Application of Hydrated Mineral Fillers as Fire Retardant and Smoke Suppressing Additives for Polymers", Macromol. Symp. 108, pp. 203-219, 1996.
(Continued)

*Primary Examiner* — Ramsey Zacharia
(74) *Attorney, Agent, or Firm* — Craig K. Leon; Nilay J. Choksi

(57) ABSTRACT

A fire retardant, vapor impermeable coating composition is disclosed which is useful for protecting gypsum, wood, polyurethane, polystyrene, and other construction materials and surfaces, such as components for buildings. The composition does not require halogenated compounds and is considered environmentally friendly. The composition is provided in the form of a liquid-applicable aqueous latex comprising at least one latex polymer and an expandable graphite, optionally a hydrophobic thickener, and optionally other fire retardants such as metal hydroxides, wherein the polymer is selected such that the composition, when coated onto a substrate and allowed to dry, has a vapor permeability not exceeding one perm ($5.70 \times 10^{-8}$ g/Pa·s·m$^2$ when tested according to ASTM E96B-10 at an average dry film thick-
(Continued)

ness of 40 mils). The invention provides fire retardant air barrier layers for construction materials, such as polyurethane or polystyrene insulation beads or panels, as well as vapor impermeable laminates for construction applications.

20 Claims, 1 Drawing Sheet

(51) Int. Cl.
*E04B 1/94* (2006.01)
*C09K 21/02* (2006.01)

(56) References Cited

U.S. PATENT DOCUMENTS

| | | | |
|---|---|---|---|
| 4,722,945 | A | 2/1988 | Wood et al. |
| 4,945,015 | A | 7/1990 | Milner |
| 5,968,669 | A | 10/1999 | Liu et al. |
| 6,207,085 | B1 | 3/2001 | Ackerman |
| 6,228,914 | B1 | 5/2001 | Ford et al. |
| 6,472,070 | B1 | 10/2002 | Muraoka et al. |
| 7,087,670 | B2 | 8/2006 | Hoch et al. |
| 7,435,762 | B2 | 10/2008 | Burgess |
| 7,504,451 | B1 | 3/2009 | Brown et al. |
| 7,601,426 | B1 | 10/2009 | Wilson et al. |
| 8,029,704 | B2 | 10/2011 | Dimanshteyn et al. |
| 8,178,449 | B2 | 5/2012 | La Vietes et al. |
| 8,372,899 | B2 | 2/2013 | Kotzev et al. |
| 10,017,943 | B1* | 7/2018 | Zhou .................... C09D 175/04 |
| 2005/0145139 | A1 | 7/2005 | Khan et al. |
| 2012/0039977 | A1* | 2/2012 | Dracopoulos .......... A01N 25/10 424/412 |
| 2012/0231170 | A1 | 9/2012 | Cao et al. |
| 2012/0309886 | A1 | 12/2012 | Park et al. |
| 2013/0101839 | A1 | 4/2013 | Dion |

FOREIGN PATENT DOCUMENTS

| | | |
|---|---|---|
| CN | 102838907 | 12/2012 |
| CN | 101709186 | 6/2015 |
| EP | 2650118 | 10/2013 |

OTHER PUBLICATIONS

Massey, Graph 42-01, entitled "Oxygen vs. vinyl acetate content through EVA" and Graph 42-02, entitled "Water vapor vs. vinyl acetate content through EVA," from Chapter 42: Ethylene-Vinyl Acetate Copolymer—EVA, Permeability Properties of Plastics and Elastomers: A Guide to Packaging and Barrier Materials (Plastics Design Library/William Andrew Publishing, Norwich NY), 2003.
Deodhar et al, "Calcium Carbonate and Ammonium Polyphosphate-Based Flame Retardant Composition for Polypropylene", Journal of Applied Polymer Science, vol. 120, 1866-1873, Dec. 2, 2010.
Cleary, "Flammability Characterization With the Lift Apparatus and the Cone Calorimeter" Building and Fire Research Laboratory, NIST, 99-115 before Feb. 6, 2014.
Gilman et al, "Flammability of Polymer Clay Nanocomposites Consortium: Year One Annual Report ", NIST 6531, Jul. 2000.
Castrovinci et al, "Ammonium polyphosphate—aluminum trihydroxide antagonism in fire retarded butadiene—styrene block copolymer", European Polymer Journal 41 (2005) 2023-2033, May 5, 2005.
Perstorp AB, "Charmor PM40 and PM15 for intumescent paints", Technical Information Leaflet TI 0158 (4 pages), Dec. 18, 2007.
Green, "A Review of Phosphorus-Containing Flame Retardants", Journal of Fire Sciences 1992; vol. 10; 470-487, Nov./Dec. 1992.
Thomas, Form PCT/ISA/220, International Search Report, International application No. PCT/US15/24706, 3 pages, dated Jul. 8, 2015.
Thomas, Form PCT/ISA/237, Written Opinion of the International Searching Authority, International application No. PCT/US15/24706, 7 pages, Jul. 8, 2015.

* cited by examiner

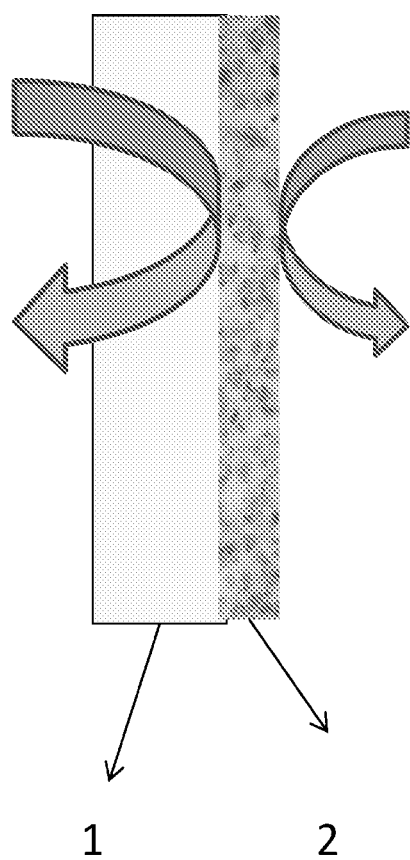
1   2

FIRE RETARDANT COATING COMPOSITION

FIELD OF INVENTION

The present invention relates to fire resistant and flexible coatings, and more particularly to compositions for making water vapor-impermeable, fire retardant coating barriers for use on construction surfaces and materials, as well as to methods for protecting construction surfaces and materials, and laminates made from these materials.

BACKGROUND OF THE INVENTION

The use of weather resistive coatings in construction applications has been on recent increase in the building and construction industries. Such coatings protect buildings from water infiltration. They may also provide air barrier properties, whereby air ingress and egress is minimized, and this in turn reduces heating and cooling costs for the building owner. These coatings may be applied to roof decks as waterproofing and may be applied over insulation to prevent ignition in the event of fire.

Air barriers can be applied to the building exterior as self-adhering membranes or liquid coatings. It is desired that liquid-applied products be water-based rather than solvent-based for health and safety reasons. It is also desired that membranes to be applied using a single component spray, because two components require spray equipment that is more complex and costly.

Many requirements for air barrier performance exist. Due to possible building movement and settling, air barriers should have elongations exceeding two hundred percent (200%). Air barriers should also possess good adhesion when applied to conventional construction materials, such as exterior gypsum board, concrete, and the like. Since air barriers are used throughout North America, such products should possess low temperature flexibility, and should avoid cracking and brittleness when used in cold winter conditions. Air barrier products should also be soft enough to provide sealing around nails and fasteners, and should be designed to resist degradation from UV and heat if left exposed during construction.

Air Barriers can be classified as either vapor permeable or impermeable with respect to water vapor. For purposes of the present invention, the term "impermeable" and the concept of water vapor impermeability shall mean and refer to less than 1 perm ($5.70 \times 10^{-8}$ g/Pa·s·m$^2$) when tested according to ASTM E96B-10, and the term "permeable" and the concept of water vapor permeability shall mean and refer to greater than 10 perms ($5.70 \times 10^{-2}$ g/Pa·s·m$^2$). (Note: whether permeability or impermeability is specified for a particular application will often depend on building design and location).

The 2012 international building codes require buildings having a height exceeding 40 feet to have a weather resistant barrier. If the barrier material is combustible, the barrier must pass requirements under NFPA 285 which requires full scale assembly testing for flame spread which should not exceed eight feet from point of ignition. Alternatively, the building design and materials may be assessed using cone calorimetric procedures in accordance with ASTM E 1354-04 which involve calculating the exothermic amount of heat per unit time for materials exposed to an incident heat flux and ignition source. It is general knowledge that standard air barrier formulations are highly flammable and that flame retardants need to be incorporated into the air barrier to meet requirements under applicable codes and regulations.

However, flame retardants have attendant advantages and disadvantages. One class of flame retardants are halogenated materials, which give rise to environmental concerns. On the other hand, hydrated mineral fillers such as magnesium hydroxide and aluminum trihydroxide are popularly used for their ability to generate water molecules during combustion and to decrease overall temperature and thus fire spread. The disadvantage of these types of fire retardants, however, is that they require high loading levels which may deleteriously impact the mechanical properties of the air barrier (See "*The Application of Hydrated Mineral Fillers as Fire Retardant and Smoke Suppressing Additives for Polymers*," by Peter R. Hornsby, Macromol. Symp. 108 (Huthig 84 Wepf. Verlag, Zug. 1996), pp. 203-219. In U.S. Pat. No. 7,504,451, Brown et al. describe a combination of aluminum trihydrate and clay for generating a char layer to improve fire retardant properties. However, clays are hygroscopic in nature and will increase water permeability of water vapor through the air barrier. Clays work most effectively when incorporated into polar polymers, which in turn have the disadvantage of having relative permeability to water vapor compared to other polymers that could otherwise be used. Another class of flame retardants is based on the use of phosphorus. These are most effective in polymers containing oxygen or nitrogen, but unfortunately phosphorous-containing polymers increase water vapor permeability.

Thus, a novel fire retardant air barrier having water vapor impermeability and desired mechanical properties such as low temperature flexibility and high elongation is needed.

SUMMARY OF THE INVENTION

In surmounting the disadvantages of the prior art, the present invention provides a coating composition for protecting construction materials and surfaces, the coating composition comprising expandable graphite, at least one film-forming latex polymer, at least one hydrophobic thickener for suspending the polymer and graphite within an aqueous latex coating, and, optionally, at least one metal hydroxide and/or zinc borate for minimizing fire spread, the resultant latex coating composition having, when applied as a coating and allowed to dry into a film, a vapor permeability of less than one perm (as measured according to ASTM E96B-10 at an average dry film thickness of 40 mils).

Compositions of the invention may be brushed or spray-applied to form a coating on a construction surfaces and materials which are water vapor permeable and/or combustible (or flammable), including, without limitation, gypsum, wood, oriented strand boards, plywood, concrete, cementitious masonry blocks and brick panels, boards, and beams. The coating may be brushed or spray-applied onto insulation material such as polyurethane or polystyrene in the form of a board, beads, or flow-able fill (e.g., after the flow-able fill material is flowed into a wall, ceiling, floor, or other cavity in building or structure and hardened in place). Compositions of the invention may also be used as pre-formed layers (film or coating) on insulation panels (e.g., polyurethane, polystyrene, gypsum) or other articles used in construction.

Thus, an exemplary composition of the present invention comprises: A liquid coating composition for protecting a construction surface or material, comprises: (A) at least one latex polymer in the amount of 1-100 parts by hundred weight of the liquid coating composition (hereinafter "PHR"), said at least one latex polymer being selected from the group consisting of carboxylated styrene butadiene, styrene butadiene, styrenated acrylates, acrylics, vinyl acrylics, butyl, copolymers of acrylic acid ester and styrene, vinyl acetate, vinyl acetate-vinyl versatate, polyvinylchloride-acrylic copolymers, carboxylated vinylidene chloride, polyvinylidene chloride acrylic copolymers, vinylchloride-ethylene, natural rubber, chloroprene, acrylate-acrylonitrile, and mixtures thereof; (B) expandable graphite in amount of 1 to 50 PHR; (C) at least one hydrophobic thickener present in an amount of 0 to 3.00 PHR, the at least one hydrophobic thickener comprising hydrophobically modified alkali swellable emulsions, hydrophobically modified ethoxylated urethane copolymers, or mixture thereof; the foregoing components A, B, and optionally C being blended such that the liquid coating composition is in the form of an aqueous latex, which, when dry, forms a dry film having vapor permeability of less than one perm ($5.70 \times 10^{-8}$ g/Pa·s·m$^2$ when tested in accordance with ASTM E96B-10 at an average dry film thickness of 40 mils).

It is possible to blend one or more polymers that are vapor impermeable with one or more polymers that are vapor permeable, so long as the resultant dried film has vapor permeability of less than one perm.

A surprising benefit discovered by the present inventor was that the use of expandable graphite in the aqueous latex changed color when the wet coating dried into a dry film. For example, a change from purple (when sprayed as a wet coating) to black (when dried into a film) can be striking and dramatic. Hence, exemplary liquid coating compositions of the invention comprise platy particles, such as expandable graphite, and at least one latex polymer, which provide a different color in the liquid (aqueous latex) composition state when compared to the color of the dry film formed from the liquid composition which comprises the platy particles and at least one latex polymer.

An exemplary method of the invention comprises applying the above composition as a coating to a construction surface or material, such as the external sheathing or component used on buildings. In further exemplary embodiments, the composition is coated, such as by spray-application, onto a combustible material (e.g., gypsum, polystyrene, polyurethane, or mixtures thereof).

Another exemplary method of the invention comprises applying the composition as a coating to the surface of a construction material in a wall or roof of a building to provide fire retardation properties so as to avoid having to reformulate the construction material with fire retardant agent as incorporated additive.

The invention also provides laminate construction materials which employ the composition as a fire retardant, vapor impermeable air barrier.

An exemplary laminate of the present invention comprises: (A) a layer comprising at least one construction material selected from the group consisting of gypsum, wood, oriented strand board, plywood, polyurethane, and polystyrene; and (B) a flame retardant layer juxtaposed against said component layer (A), the flame retardant layer comprising (i) expandable graphite in an amount of 1 to 70 percent by volume of the flame retardant layer; (ii) at least one latex polymer being selected from the group consisting of carboxylated styrene butadiene, styrene butadiene, styrenated acrylates, acrylics, vinyl acrylics, butyl, copolymers of acrylic acid ester and styrene, vinyl acetate, vinyl acetate-vinyl versatate, polyvinylchloride-acrylic copolymers, carboxylated vinylidene chloride, polyvinylidene chloride acrylic copolymers, vinylchloride-ethylene, natural rubber, chloroprene, acrylate-acrylonitrile, and mixtures thereof, the at least one latex polymer being present in an amount of 40 to 98 percent by volume of the flame retardant layer; and (iii) at least one hydrophobic thickener comprising hydrophobically modified alkali swellable emulsions, hydrophobically modified ethoxylated urethane copolymers, or mixture thereof, the at least one hydrophobic thickener being present in an amount of 0 to 1 percent by volume of the flame retardant layer; the flame retardant layer having a vapor permeability of less than one perm ($5.70 \times 10^{-8}$ g/Pa·s·m$^2$ when tested in accordance with ASTM E96B-10 at an average dry film thickness of 40 mils).

In further exemplary embodiments, the laminate article comprises at least two construction materials selected from component A.

Further advantages and features of the invention are discussed hereinafter.

BRIEF DESCRIPTION OF DRAWINGS

Further advantages and features of the present invention may be more readily comprehended when the following detailed description of preferred embodiments is considered in conjunction with appended drawings wherein:

FIG. 1 is a schematic diagram of an exemplary laminate of the present invention formed by coating an exemplary liquid composition of the invention onto a substrate surface, such as a water vapor permeable and/or combustible material, and allowing the composition to dry to form a water vapor impermeable film.

DETAILED DESCRIPTION OF EXEMPLARY EMBODIMENTS

The present invention now will be described more fully hereinafter with reference to the accompanying drawings, in which various exemplary embodiments are shown illustrating variations within the scope of the invention. This disclosure may, however, be embodied in many different forms and should not be construed as limited to the embodiments set forth herein; rather, these embodiments are provided so that this disclosure will be thorough and complete and fully convey the scope of the invention to those of ordinary skill in the art.

As shown in FIG. 1, an exemplary water vapor impermeable coating layer 2 of the present invention may be applied to a substrate surface 1. The substrate surface 1 may be a water vapor permeable gypsum board, as typically used on an inside or outside wall of a building. Other substrates can include wood, oriented strand board, plywood, concrete, cementitious masonry blocks, and bricks. Alternatively, the water vapor impermeable layer 2 can be formed into a sheet that is thereafter laminated against the substrate surface 1.

As summarized previously, compositions of the invention may be brushed or spray-applied to form a coating on construction materials and surfaces, and/or components which are water vapor permeable and/or combustible (or flammable), including, without limitation, gypsum, wood, oriented strand boards, plywood, concrete, cementitious masonry blocks and brick panels, boards, and beams. Some of these materials may be coated with thin paper (e.g., paper wrapped gypsum drywall or plastic coated versions for outdoor installation). The coating composition may be brushed or spray-applied onto insulation material such as polyurethane or polystyrene in the form of a board, beads, or flow-able fill (e.g., after the flow-able fill material is flowed into a wall, ceiling, floor, or other cavity in building or structure and hardened in place). Compositions of the invention may also be used as pre-formed layers (film or coating)

on insulation panels (e.g., polyurethane, polystyrene, gypsum) or other articles used in building or construction, which may be adhered to the insulation panels or other construction materials by any known means, such as glue, adhesives, mastics, or fasteners (e.g., screws, nails). The compositions of the invention may be coated onto paper- or plastic-coated gypsum drywall panels, for example; or may be used to replace the paper- or plastic-based coatings on panels. All of the foregoing means of attaching the films or coating layers onto the construction layers or materials (which may be coated with paper or other thin protective layers) may hereinafter be described as being adhered to or disposed against, or otherwise juxtaposed herewith so as to form coated or laminate articles of the invention.

The coating layer comprises expandable graphite flakes (which exfoliate upon exposure to high temperature due to intercalation of acid between the flakes) and at least one film forming polymer that can be suspending within an aqueous latex (e.g., carboxylated styrene butadiene latex), a hydrophobic thickener, and optionally aluminum trihydrate, a metal borate (e.g., zinc borate), or mixture of both aluminum trihydrate and metal borate, wherein the at least one latex polymer, expandable graphite flakes, thickener, and optional aluminum trihydrate and/or metal borate are provided in an aqueous latex form, which, when applied as a coating onto a substrate surface and allowed to dry to an average dry film thickness of about 1 mm (or 0.04 inches) has a water vapor impermeability of less than one perm in accordance with ASTM E96B-10.

In further exemplary embodiments, metal hydroxides may be further incorporated into the composition to improve flame retardancy while maintaining certain desirable mechanical and gas barrier properties in the resultant dried air barrier film.

The use of expandable graphite in polymer latexes is known in the art (See e.g., U.S. Pat. No. 3,574,644), but until the present invention it has not been suggested that the resultant polymer latex be vapor impermeable when dried into a film, nor has it been taught how to achieve such coatings or laminates. Expandable graphite is made by intercalating graphite flakes with an acid, such that, upon exposure to heat, the acid vaporizes and the graphite increases in volume. This change in volume, sometimes referred to as intumescence, creates a char that minimizes the release of flammable vapors.

In the construction industry, the water vapor permeance of air barrier layers is calculated from the water vapor transmission rate using ASTM E96B-10. Depending upon the building design and location, it is either desirable to have the air barrier open or closed to water vapor. Air barriers which are considered to be of the closed variety are referred to as being "vapor impermeable" and having a water vapor transmission rate that is less than (<) 1.0 perm ($5.70 \times 10-8$ g/Pa·s·m2) when tested according to ASTM E96B-10. The chemical nature of the polymer can affect the rate at which water vapor passes through the polymer layer.

EXAMPLE 1

The present inventors inventively selected polymers for use in polymer latexes and tested various polymer latexes by coating the latex polymers onto a siliconized release sheet and allowed the coatings to dry for one week under ambient lab conditions. The dried film thicknesses ranged from 30 to 50 mils (0.762 to 1.27 mm). The dried films were then tested in accordance with against ASTM E96B-10. Results are summarized in Table 1.

The dry latex film is tested by exposing it to a flame for five seconds and observing it after removing it from the flame to ascertain whether it ignites and continues to burn on its own. Results are also summarized below in Table 1.

The dry latex film is also tested for flexibility or elongation, as it is desired that air barrier films avoid cracking due to building movement or when applied over gaps in sheathing. Since the addition of flame retardants and other additives could reduce elongation, the present inventors believe that it is desirable for the latex film (when dry) to have a final elongation exceeding 200% when tested in accordance with ASTM D412-98 at a crosshead speed of 20"/min (2.54cm). Results are set forth in Table 1 below.

TABLE 1

| Polymer | Permeance, perms (g/Pa·s·m$^2$) | Sustain Ignition | % Elongation at Break |
|---|---|---|---|
| Carboxylated vinylidene chloride | 0.01 (7.02 × 10−11) | No | 89 |
| Polyvinylidene chloride acrylic copolymer | 0.06 (3.42 × 10−9) | Yes | 142 |
| PVC acrylic copolymer | 3 (1.71 × 10−7) | Yes | 280 |
| Carboxylated styrene butadiene | 0.3 (1.71 × 10−8) | Yes | >1000 |
| Styrenated acrylate | 1.5 (8.6 × 10−8) | Yes | >1000 |
| Vinyl acetate vinyl versatate | 1.3 (7.46 × 10−8) | Yes | 887 |
| Copolymer of acrylic acid ester and styrene | 1.6 (9.12 × 10−8) | Yes | >1000 |
| Butyl | 0.01 (7.02 × 10−11) | Yes | >1000 |

The present inventors confirm that not all latex polymers have desired properties for air barriers. For example, the vinylidene chloride copolymers have low permeance but also have low elongation. The high chloride content (59%) of carboxylated vinylidene chloride confers self-extinguishing properties, but halogenated polymers are not viewed environmentally friendly, especially with the toxic gas given off during fire exposure. On the other hand, vinyl acetate and acrylics provide elongation but suffer from high vapor permeance and do not provide properties otherwise desired by the present inventors. The carboxylated styrene butadiene and butyl meet the low vapor permeability and elongation requirements of the present inventor; but these polymers ignited and burned as result of the ignition flame test applied by the present inventor.

The flammability requirements for air barriers are based on the 2012 IBC building codes. Buildings of construction type I, II, III or IV and greater than 40 feet require combustible air barriers to pass NFPA 285. This is a complete assembly burn test, where is not allowed to have the fire spread 10 feet vertically. An alternate way to characterize the performance of the air barrier in a fire scenario is to measure the amount of heat released by cone calorimetric procured described in ASTM E 1354-04 (year?). The standard in the industry is to apply an incident heat flux of 50 kW/m2 and measure the heat released over time, the time required to initiate ignition and burn time. Using these parameters, one can calculate the "b" value, which indicates the propensity of the material to spread flame during a fire exposure. A "b" value that is greater than zero would indicate vertical flame spread and a value less than zero would indicate a decrease in flame spread (See "Flammability Characterization with the Lift Apparatus and the Cone calorimeter," Thomas G. Gleary, Building and Fire Research Laboratory, National Institute of Standards and Technology (Gaithersburg, Md. 20899), pp. 99-115). It is desirable for the air barrier formulation to have a zero or negative b value when tested against ASTM E 1354-04 using incident heat flux of 50 kW/m².

EXAMPLE 2

To test the effectiveness of various flame retardants and their effect on mechanical properties of an air barrier film (when dry), formulations containing latex polymers from Table 2 were tested. For permeance and elongation testing, the coating was drawn down on a release film to a wet film thickness of 70 mils and allowed to dry for one week at room temperature. The dry film samples were then tested according to ASTM E 96B-10 and ASTM D 412-98. For cone calorimeter testing, the coatings were cast onto exterior gypsum board and allowed to dry for one week. Four inch (2.54 cm) square samples were then cut out and tested against ASTM E 1354-04 using an incident heat flux of 50 kW/m2. The b value was then calculated using the average peak heat release rate, time to ignition and total burn time.

TABLE 2

|  | 1 | 2 | 3 | 4 |
|---|---|---|---|---|
| Carboxylated styrene butadiene latex | 100 | 100 | 100 | 100 |
| Aluminum trihydrate | 50 | 50 | 50 | 50 |
| Zinc borate | 0 | 5 | 5 | 5 |
| Chlorinated paraffin | 0 | 0 | 5 | 5 |
| Sodium montmorillonite clay | 0 | 0 | 0 | 3 |
| Permeance, perms | 0.2 | 0.4 | 0.35 | 1.9 |
| Total Elongation, % | 500 | 196 | 193 | ND |
| b value | 0.69 | 0.39 | 0.33 | 0.05 |

The polymer latex contains 51% solids. The present inventor discovered that, even at levels of 50% by weight in the dried polymer latex film, the aluminum trihydrate was not very effective as a flame retardant as the "b" value is still highly positive. The present inventor also discovered that addition of small amounts of zinc borate did improve flame retardancy, and that the "b" value was still positive; and also discovered that the zinc borate did have a negative effect on elongation. The present inventor also discovered that addition of a chlorinated flame retardant was not very effective. While all three of these flame retardants did not have a negative effect on water vapor permeance, the present inventor discovered that addition of bentonite type clay significantly improved flame retardancy, confirming the flame retardancy of clay as mentioned in the literature (See e.g., *Flammability of Polymer Clay Nanocomposites Consortium: Year One Annual Report*, Jeffrey W. Gilman, Takashi Kashiwagi-1, Alexander B. Morgan-1, Richard H. Harris, Jr.-1, Lori Brassell-1, Mark VanLandingham-1 and Catheryn L. Jackson-2; 1-Building and Fire Research Laboratory, 2-Materials Science and Engineering Laboratory, National Institute of Standards and Technology, Gaithersburg, Md.). However, the clay also raised the water vapor permeance to an unacceptable level, as bentonite clays are hydrophilic and will cause the polymer to absorb water. The present inventor believes that this is not acceptable property for a vapor impermeable waterproof coating, as the vapor permeance should be below 1.0 perm.

EXAMPLE 3

The following formulations are tested with regard to the effectiveness of expandable graphite as a flame retardant. Two different grades of expandable graphite are evaluated: one having an expansion ratio of 160:1; another having an expansion ratio of 210:1. The present inventor notes that the expansion ratio is affected by the particle size; the larger the particle size, the larger is the expansion ratio.

TABLE 3

|  | 1 | 2 | 3 | 4 | 5 | 6 |
|---|---|---|---|---|---|---|
| Carboxylated styrene butadiene latex | 100 | 100 | 100 | 100 | 100 | 100 |
| Aluminum trihydrate | 40 | 25 | 50 | 0 | 0 | 15 |
| Expandable graphite, 160:1 | 10 | 10 | 0 | 10 | 0 | 12.5 |
| Expandable graphite, 210:1 | 0 | 0 | 5 | 0 | 10 | 0 |
| Permeance, perms (g/Pa · s · m2) | 0.22 ($1.26 \times 10^{-8}$) | 0.2 ($1.29 \times 10^{-8}$) | 0.2 ($1.29 \times 10^{-8}$) | 0.2 ($1.29 \times 10^{-8}$) | 0.3 ($1.71 \times 10^{-8}$) | ND |
| Total % Elongation | 303 | 377 | 340 | 563 | 299 | 312 |
| B value | −0.34 | −0.55 | −0.59 | 0.03 | −0.2 | −0.24 |

The present inventor discovered that the use of expandable graphite did not have an effect on the water vapor permeance of the coatings, and believes that expandable graphite would allow the coating to maintain low water vapor permeability. Expandable graphite also did have a very significant improvement in fire retardancy, allowing most formulations tested to resist vertical flame spread. The present inventor also believes that use of the lower expansion ratio graphite in combination with hydrated metal filler improves fire retardancy of the air barrier film, as the present inventor discovered that hydrated filler emits water at the beginning of the cone calorimeter test and this slows down the ignition time of the material. The present inventor also discovered that larger particle size graphite has a more negative effect on elongation, so that the formulation will need to take this into account to achieve optimum properties. The present inventor prefers using expandable graphite having lower expansion levels as this may have less detrimental effect on elongation in the dry film coating but would require higher levels to achieve required flame retardancy.

In the cone calorimeter test, using temperatures exceeding 200 degrees Celsius, it was discovered that the expandable graphite exfoliates and slows down the escape of flammable vapors to the surface of the sample. However, the mechanism appears to be different from other intumescent materials. The expanded graphite does not form a hard char but nevertheless slows down release of vapors and, once the vapors have escaped, there remains a significant amount of black powdery graphite. Other intumescent materials form a hard char during the processing of intumescing but also appear to have an unburnt layer beneath the char once it is scraped off the surface.

EXAMPLE 4

The present inventor tested flame retardants used in conventional intumescent coatings, such as phosphorus and melamine based coatings. Results are shown in Table 4.

TABLE 4

|  | 1 | 2 | 3 | 4 |
|---|---|---|---|---|
| Carboxylated styrene butadiene latex | 100 | 100 | 100 | 100 |
| Aluminum trihydrate | 25 | 0 | 0 | 0 |
| Expandable graphite, 160:1 | 10 | 10 | 10 | 10 |
| Ammonium polyphosphate, type II crystal | 6 | 6 | 10 | 0 |
| Melamine cyanurate | 0 | 0 | 0 | 9 |
| Chlorinated paraffin | 0 | 0 | 0 | 10 |
| Permeance, perms | 0.8 | 0.7 | 1.1 | 0.8 |
| b value | −0.13 | 0.38 | ND | 0.27 |
| Total % elongation | 268 | 498 | ND | 475 |

As indicated above in Table 4, the present inventor tested ammonium polyphosphate (APP), a common fire retardant used in intumescent coatings, but did not detect an improvement in fire retardancy in the various formulations. Use of APP in the first sample summarized above, compared to the first sample in Example 3, appeared to increase the "b" value. The present inventor tested the film sample of Example 2 to ascertain the effect of APP without the ATH, as she was aware of a research paper which suggested that there were antagonistic effects using these two materials (See e.g., Castrovinci A, et al., "Ammonium Polyphosphate-Aluminum Trihydroxide Antagonism in Fire Retarded Butadiene-Styrene Block Copolymer," *European Polymer Journal* (vol. 41) (2005), pages 2023-2099. Comparing the film sample made according to Example 2 to the film sample made according to Sample 4 in Example 3 led to the discovery by the present inventor that both "b" value and permeance increase with addition of APP.

The present inventor made an air barrier film using a larger amount of APP; however, it was found that vapor permeability exceeded 1 perm ($5.70 \times 10^{-8}$ g/Pa·s·m$^2$), so fire testing was not performed. In replacing the APP with melamine cyanurate, similar results were seen in terms of an increase in "b" value but also in terms of permeance. All samples after burning did not render a strong char, but only a large amount of black powder.

In typical intumescence formulations, an acid generating catalyst such as APP reacts with a carbon donor, such as a polyol, to form a char. A blowing agent, such as melamine, then generates gas to cause the volume increase. The present inventor believes that for a stable char to form, an oxygen containing species should be used, such as a polyol (See e.g., Green Joseph, "A Review of Phosphorous Containing Flame Retardants," *Journal of Fire Sciences*, 10, 470-487 (1992). However, the present inventor expects that the addition of polyol would cause water vapor permeance of the air barrier film to exceed 1 perm ($5.70 \times 10-8$ g/Pa·s·m2), as she had demonstrated above her discovery that use of APP and melamine tends to increase permeance of the air barrier coating.

EXAMPLE 5

The present inventor tested typical intumescent coating formulations. Some can be seen at http://www.tri-iso.com/documents/Perstorp Charmor waterbased formulations.pdf); but additives known to increase permeance were substituted with additives not known to affect permeance. Mixing and testing procedure were the same as with previous examples.

TABLE 5

| | |
|---|---|
| Ammonium salt of hydrophobia copolymer dispersant | 3.58 grams |
| Water | 50.07 |
| TiO2 | 21.1 |
| Pentaerythritol | 31.34 |
| Melamine cyanurate | 26.27 |
| Ammonium polyphosphate | 77.50 |
| Hydrophobic non-ionic associative thickener | 3.51 |
| Carboxylated styrene butadiene latex | 87.89 |
| Water | 28.30 |
| Permeance, perms (g/Pa · s · m2) | 8 ($4.56 \times 10^{-7}$) |
| Total % elongation | 13.8 |

The above example shows that typical intumescent formulations are too water vapor permeable and have very low flexibility, and thus cannot provide a fire resistant, flexible, impermeable coating. The present invention describes, on the other hand, a unique and novel formulation which meets the performance criteria of the present inventor.

In addition to usefulness as an air barrier, the present invention provides a coating composition that can be used to retard flame spread on insulation materials, such as materials used in the exterior of buildings. Based on ICC 2012 codes, continuous exterior insulation is now required for buildings exceeding 40 feet in height (1219 cm). If the insulation is combustible, it must also pass the full assembly burn test under NFPA 285. Examples of combustible exterior insulation materials include expanded polystyrene, sprayed polyurethane foam, and polyisocyanurate. Insulation made from these materials would tend to spread flames and would require the inclusion of flame retardants in order to meet fire safety code requirements. However, the present inventor believes that, rather than developing a new foam formulation, the present invention could be used to increase flame retardancy by application to the outer surface of the flammable material, without having to reformulate the flammable material. Thus, an elegant solution is to spray-coat the surface of insulation materials to render them flame retardant.

EXAMPLE 6

A typical sprayed polyurethane foam insulation product was sprayed onto release paper and allowed to cure at room temperature for one week. The insulation was cut into two 4 square inch sections (2.54 cm), and one sample was coated by spraying to a wet film thickness of 60 mils (1.524 mm) and allowed to dry at room temperature for a week. Samples were then tested for fire spread under the ASTM E1354-04 at an incident heat flux of 50 kW/m$^2$.

TABLE 6

| | |
|---|---|
| Carboxylated styrene butadiene latex | 100 |
| Aluminum trihydrate | 25 |
| Expandable graphite, 160:1 | 10 |
| TiO2 | 2 |
| Hindered phenol antioxidant | 1 |
| Silicone based defoamer | 0.3 |
| Ammonium salt of hydrophobic copolymer dispersant | 0.13 |
| Hydrophobic non-ionic associative thickener | 0.9 |

The amounts of components are expressed in terms of weight. The "b" values for the sprayed polyurethane foam without coating and with coating (as formulated above in Table 6) are shown below in Table 7.

TABLE 7

| | "b" value (ASTM E 1354-04) |
|---|---|
| No Coating | 0.41 |
| With Coating | −0.15 |

The sprayed polyurethane foam insulation sample ignited quickly in the cone test and had a peak heat release rate of 290 kw/m2. This is a significant amount of heat release in which the flames spread vertically. On the other hand, the present inventor discovered that the coated sprayed polyurethane foam insulation sample had a peak heat release rate of 180 Kw/m$^2$ and immediately dropped down to 120 Kw/m$^2$ when the graphite expanded. This expansion limits the amount of fuel being supplied and retards the spread of the flame.

In addition to flame retardants, exemplary air barrier coating compositions of the present invention may also contain typical compounding ingredients, such as pigments, anti-oxidants, UV stabilizers, dispersants, thickeners, defoamers, coalescing agents, fillers, plasticizers and freezing point depressants. Low temperature additives such as those described in US Publication No. 2012/0231170 may be incorporated into used.

The present inventor believes that the level of expandable graphite to be contained in the air barrier composition is important for maintaining both flame retardancy and high elongation. If the amount of expandable graphite is too low, the "b" value can become positive; while if the amount of expandable graphite is too high, the elongation goes below 200.

Preferably, the amount of expandable graphite in the composition should be between 1 to 50 PHR; and, more preferably, the amount of expandable graphite is 3 to 40 PHR; and, most preferably, 5 to 38 PHR.

In preferred embodiments, particle size and expansion ratios are important to control. Too small a particle and the flame retardancy may not be sufficient; while if the particles are too large, this would reduce elongation and thus flexibility of the air barrier when in the dry film state. In preferred embodiments of the invention, the expansion ratio of the expandable graphite is 90:1 to 230:1.

In other preferred embodiments, the liquid coating composition is made using a water based latex polymer in which one or more polymers are already suspended within an aqueous carrier. (The term "latex polymer" as used herein refers to a film-forming polymer or polymers which are applied in the form of a latex coating and form a film when dried). When coated onto a substrate surface and allowed to dry into a dry film, the film is impermeable to water vapor and has a glass transition temperature (Tg) that is less than 40 degrees Fahrenheit (or 4.4 degrees Celcius). Typical polymers available in latex form include, without limitation, the following: carboxylated vinylidene chloride, polyvinylidene chloride acrylic copolymers, ethylene vinyl chloride, carboxylated styrene butadiene, styrene butadiene, self-cross-linking styrenated acrylics, butyl latex, and mixtures of the foregoing. This list is not exhaustive, and is provided for illustrative purposes only.

It is also possible to blend permeable and impermeable latex polymers so long as the final permeance of the dry film which is formed from the latex has vapor permeability of less than one perm ($5.70 \times 10^{-8}$ g/Pa·s·m$^2$). For low temperature applications, it is desirable for the latex to have a glass transition temperature (Tg) which is preferably less than 40 degrees Fahrenheit. Plasticizers may also be used to reduce Tg.

To provide a suitable rheology for spray and brush applications, the present inventor prefers to employ at least one thickener, and preferably one that is hydrophobic in nature. It is possible to employ permeable or (water-)swellable materials such as bentonite clays, cellulose, and amorphous silica type thickeners, but these would increase the water vapor permeance of the film in its dry state, and so use of such permeable materials should be judicious and limited. Hydrophobic thickeners, such as hydrophobic non-ionic associative thickeners, are preferred for co-suspending expandable graphite and polymers in the coating compositions of the invention. Hydrophobically modified alkali swellable emulsions can be used as thickeners. A preferred thickener is hydrophobically modified ethoxylated urethane copolymer. For example, a commercially available polyurethane type thickener is available from Southern Clay under the brand name Optiflow™ H600. The molecular weight will vary depending on the degree of Newtonian to psuedoplasticity that is required.

Another surprising portion of the invention is color change of the latex. Latexes are emulsions and white in color due to the polymer particles being larger than the wavelength of light. Some latexes have an iridescence property due to a narrow particle size distribution. Adding platy particles to this latex causes the solution to change from milky white to purple in color. When the latex dries, it changes color from purple to that of the platy reflective particle. This attribute allows the applicator to know when the coating is dry without having to guess or touch the surface.

Thus, exemplary liquid coating compositions of the invention comprise platy particles, such as expandable graphite, and at least one latex polymer, which provide a different color in the liquid (aqueous latex) composition state when compared to the color of the dry film formed from the liquid composition which comprises the platy particles and at least one latex polymer.

The present invention is described herein using a limited number of illustrative embodiments not intended to limit the scope of the invention as otherwise described and claimed herein. Modifications and variations from the described embodiments can exist. It should be understood that the invention is not limited to the specific details set forth above.

It is claimed:

1. A liquid coating composition for protecting a substrate surface, comprising:
    at least one latex polymer in the amount of 1-100 parts by hundred weight of the liquid coating composition (hereinafter "PHR"), the at least one latex polymer being selected from the group consisting of carboxylated styrene butadiene, styrene butadiene, styrenated acrylates, acrylics, vinyl acrylics, butyl, copolymers of acrylic acid ester and styrene, vinyl acetate, vinyl acetate-vinyl versatate, polyvinylchloride-acrylic copolymers, carboxylated vinylidene chloride, polyvinylidene chloride acrylic copolymers, vinylchloride-ethylene, natural rubber, chloroprene, acrylate-acrylonitrile, and mixtures thereof;
    expandable graphite in amount of 1 to 50 PHR;
    at least one hydrophobic thickener present in an amount of 0 to 3.00 PHR, the at least one hydrophobic thickener being selected from the group consisting of hydrophobically modified alkali-swellable emulsion, hydrophobically modified ethoxylated urethane copolymer, or mixture thereof;

the foregoing components being blended such that the liquid coating composition is in the form of an aqueous latex, which, when dry, forms a dry film having:

a water vapor permeability of less than one perm ($5.70 \times 10^{-8}$ g/Pa·s·m$^2$ when tested in accordance with ASTM E96B-10 at an average cry film thickness of 40 mils, a "b" value of zero or less as measured in accordance with ASTM E1354-04 at an incident heat flux of 50 kW/m$^2$, and an elongation percentage at break of 200% or more as measured in accordance with ASTM D412-98 at a crosshead speed of 20"/min.

2. The liquid coating composition of claim 1 wherein the at least one hydrophobic thickener is present in the liquid composition in an amount of at least 0.01 PHR.

3. The liquid coating composition of claim 1 further comprising a flame retardant material selected from a metal hydroxide, a metal borate, or mixture thereof.

4. The liquid coating composition of claim 1 wherein the at least one latex polymer is selected from the group consisting of carboxylated vinylidene chloride, polyvinylidene chloride acrylic copolymers, ethylene vinyl chloride, carboxylated styrene butadiene, styrene butadiene, self-cross-linking styrenated acrylics, butyl latex, and mixtures thereof.

5. The liquid coating composition of claim 4 further comprising aluminum trihydrate.

6. The liquid coating composition of claim 1 wherein the at least one latex polymer is carboxylated styrene butadiene.

7. The liquid coating composition of claim 6 further comprising aluminum trihydrate.

8. The liquid coating composition of claim 1 wherein the expandable graphite has an expansion ratio of 90:1 to 230:1.

9. The liquid coating composition of claim 1 wherein the latex polymer has a glass transition temperature not exceeding 40 degrees Fahrenheit.

10. The liquid coating composition of claim 1 further comprising a freezing point depressing agent in the amount of 1 to 30 PHR.

11. The liquid coating composition of claim 10 wherein the freezing point depressing agent is selected from the group consisting of alcohols and salts.

12. The liquid coating composition of claim 1 further comprising at least one compounding material selected from pigments, antioxidants, UV stabilizers, dispersants, defoamers, thickeners, coalescing agents, fillers, plasticizers, freezing point depressants, and mixtures thereof.

13. A method for protecting a construction substrate surface, comprising: coating onto a building or construction substrate surface the composition of claim 1.

14. An article comprising a construction material and a film formed by coating thereon the composition of claim 1.

15. The article of claim 14 wherein the construction material is a panel or beam comprising gypsum, wood, oriented strand board, plywood, polyurethane, polystyrene, or mixture thereof.

16. The article of claim 15 wherein the construction material is polyurethane, polystyrene, or mixture thereof.

17. The article of claim 15 wherein the polyurethane, polystyrene, or mixture thereof is flowed into a building cavity, and the coating composition is coated onto the surface of the combustible material after it is flowed into the building cavity.

18. The liquid coating composition of claim 1, wherein the composition has a different color before drying and after drying.

19. A laminate article comprising:
(A) a layer comprising at least one construction material selected from the group consisting of gypsum, wood, oriented strand board, plywood, polyurethane, and polystyrene; and
(B) a flame retardant layer juxtaposed against said layer (A), said flame retardant layer comprising
  (i) expandable graphite in an amount of 1 to 70 percent by volume of the flame retardant layer,
  (ii) the at least one latex polymer being selected from the group consisting of carboxylated styrene butadiene, styrene butadiene, styrenated acrylates, acrylics, vinyl acrylics, butyl, copolymers of acrylic acid ester and styrene, vinyl acetate, vinyl acetate-vinyl versatate, polyvinylchloride-acrylic copolymers, carboxylated vinylidene chloride, polyvinylidene chloride acrylic copolymers, vinylchloride-ethylene, natural rubber, chloroprene, acrylate-acrylonitrile, and mixtures thereof, the at least one latex polymer being present in an amount of 40 to 98 percent by volume of the flame retardant layer; and
  (iii) at least one hydrophobic thickener comprising hydrophobically modified alkali swellable emulsions, hydrophobically modified ethoxylated urethane copolymers, or mixture thereof, said at least one hydrophobic thickener being present in an amount of 0 to 1 percent by volume of the flame retardant layer;

wherein the flame retardant layer has:
  a water vapor permeability of less than one perm ($5.70 \times 10^{-8}$ g/Pa·s·m$^2$ when tested in accordance with ASTM E96B-10 at an average dry film thickness of 40 mils),
  a "b" value of zero or less as measured in accordance with ASTM E1354-04 at an incident heat flux of 50 kW/m$^2$ and
  an elongation percentage at break of 200% or more as measured in accordance with ASTM D412-98 at a crosshead speed of 20"/min.

20. The laminate of claim 19 comprising at least two construction materials selected from group A.

* * * * *